R. H. MUSCOTT.
TREAD BELT ATTACHMENT FOR TRUCKS.
APPLICATION FILED SEPT. 25, 1918.
1,397,139.
Patented Nov. 15, 1921.
2 SHEETS—SHEET 2.
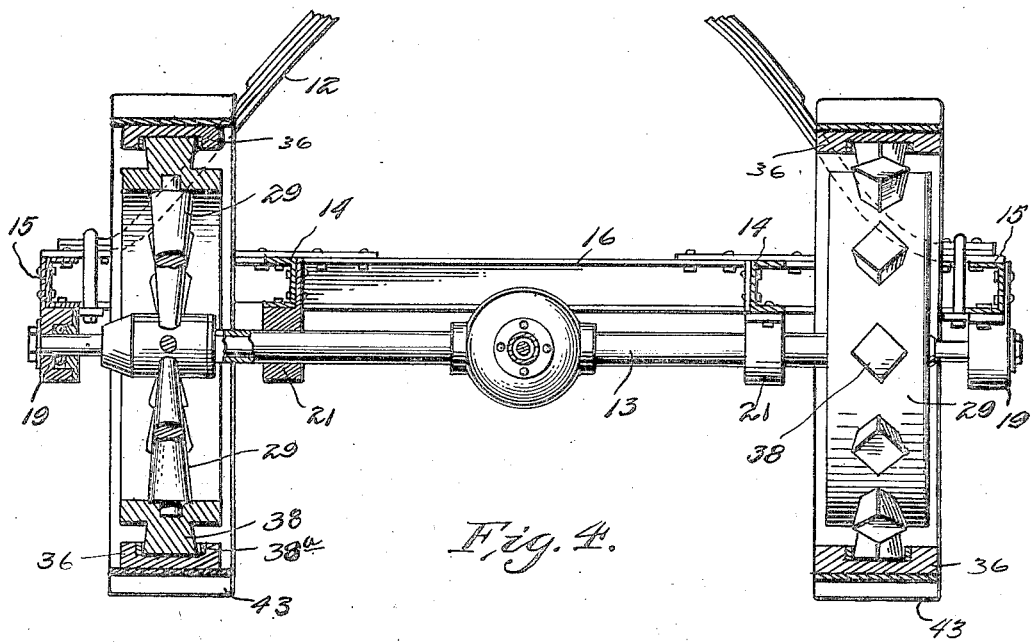
Fig. 4.
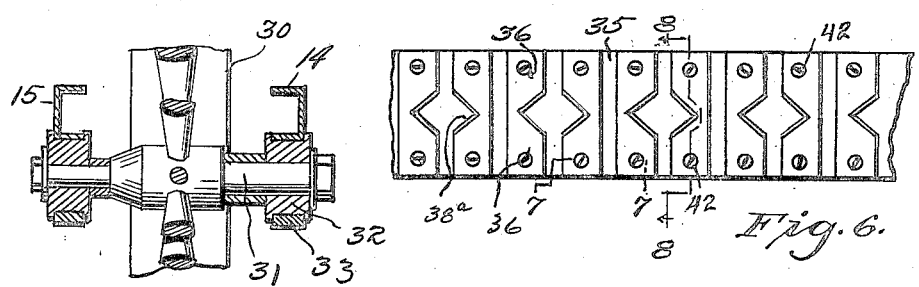
Fig. 5.
Fig. 6.
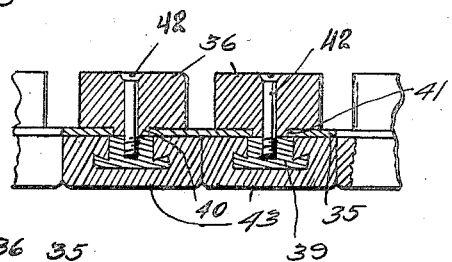
Fig. 7.
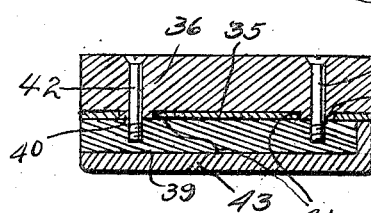
Fig. 8.
Inventor
R. H. Muscott
Witnesses
By
Attorney

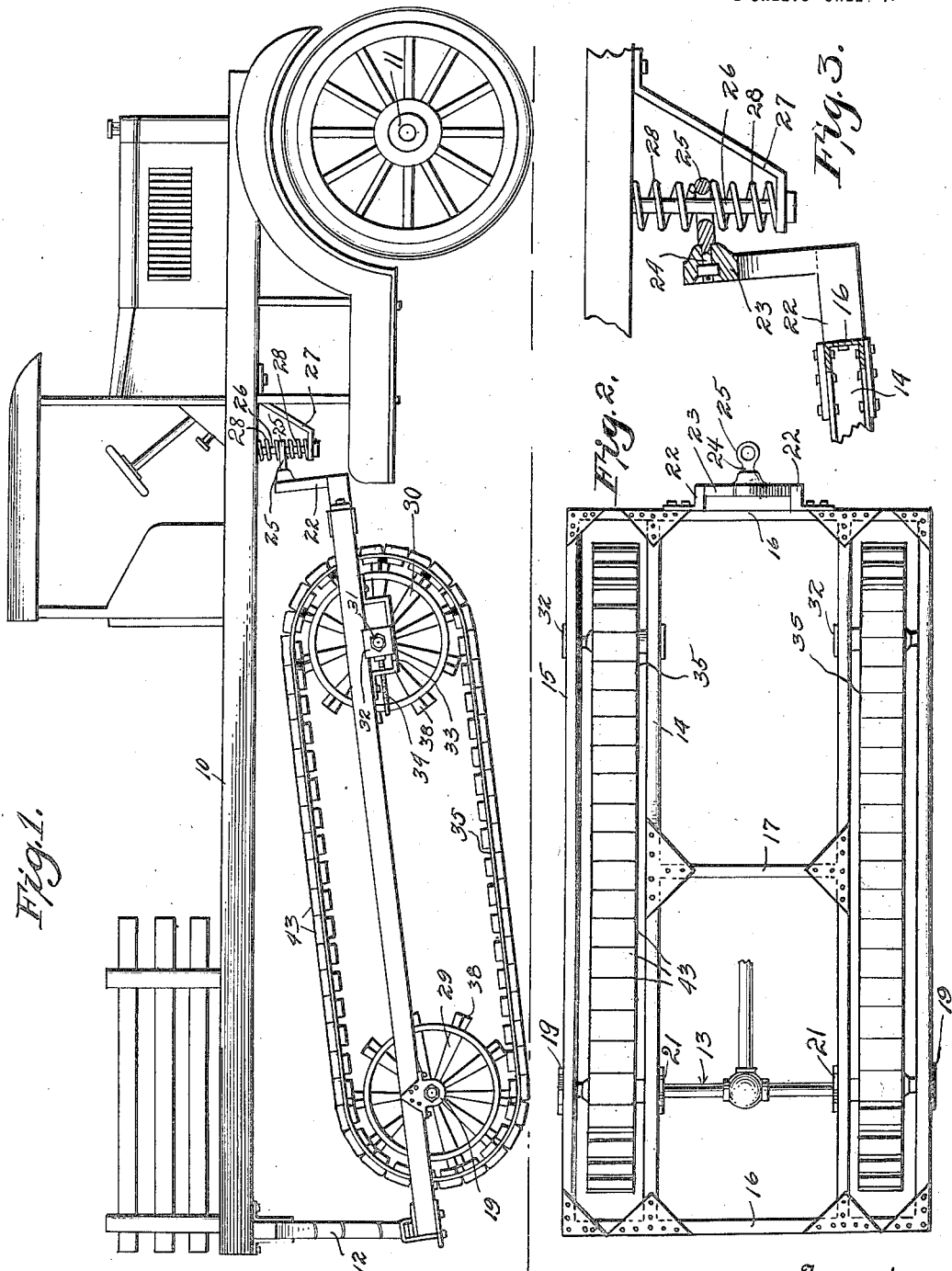

UNITED STATES PATENT OFFICE.

RAY H. MUSCOTT, OF SWAN CREEK, MICHIGAN.

TREAD-BELT ATTACHMENT FOR TRUCKS.

1,397,139.

Specification of Letters Patent.

Patented Nov. 15, 1921.

Application filed September 25, 1918. Serial No. 255,724.

*To all whom it may concern:*

Be it known that I, RAY H. MUSCOTT, a citizen of the United States, residing at Swan Creek, in the county of Saginaw, State of Michigan, have invented certain new and useful Improvements in Tread-Belt Attachments for Trucks; and I do hereby declare the following to be a full, clear, and exact description of the invention, such as will enable others skilled in the art to which it appertains to make and use the same.

The present invention relates to new and useful improvements in tread belts for motor vehicles and more particularly to that type wherein the tread belts are carried by a frame member independent of and resiliently connected with the main frame or chassis of the vehicle.

It is in general the object of the present invention to simplify and otherwise improve the structure and increase the efficiency of mechanisms of this character, whereby a flat traveling surface may be provided for a motor vehicle in a manner avoiding the objections of weight encountered in the present types of treads of this general character, and of rapid wear encountered in such treads by reason of foreign matter lodging in the hinged connections thereof.

It is a further and important object to provide an arrangement wherein the tread belts automatically adapt themselves to the surface traveled upon, to vary the amount of tread surface engaging the traveling surface, in accordance with the depth to which the tread structure penetrates the traveling surface.

A still further object resides in the provision of a tread belt mechanism provided in a unitary structure which may be readily applied to ordinary wheel motor vehicles now in use, and which may be substituted for the tread mechanisms of vehicles employing the present types of such mechanisms.

With the above and other objects and advantages in view, the invention resides more particularly in the novel combination, formation and arrangement of parts hereinafter described and particularly pointed out in the appended claims.

In the accompanying drawings:

Figure 1 is a side elevational view of a motor vehicle embodying the improved tread belt mechanism as an attachment therefor in lieu of the ordinary rear drive wheels.

Fig. 2 is a plan view of the improved tread belt attachment.

Fig. 3 is an enlarged longitudinal section of the pivot between the frame of this structure and the main frame of the motor vehicle.

Fig. 4 is an enlarged transverse section through the rear axle, looking to the rear.

Fig. 5 is a sectional detail through the hub of one idle sprocket.

Fig. 6 is a plan view of the belt viewed from the inside; and

Figs. 7 and 8 are longitudinal and transverse sectional details through said belt and the cleats and shoes attached thereto.

Referring now more particularly to the accompanying drawings, there is shown a conventional motor truck comprising a main frame or chassis 10 mounted on the front wheel structure 11 at its forward end and having the usual supporting springs 12 at its rear end, which, in the application of the improved tread belt attachment to the truck are shifted rearwardly of their normal point of attachment to the rear axle structure 13.

The improved tread belt attachment includes a frame formed of inner and outer side sills 14 and 15 respectively connected at their ends with cross bars 16 by the corner plates common in truck frame construction, the inner side sills 14 being connected at their central portions by a cross bar 17, and it is noted that the spaces between the sills provide clearance for the belt runs. The outer sills 15 near their rear ends are connected with the ends of the rear truck axle 13 by bearings 19 depending from said sills and engaging the axle ends at the point of normal attachment of the wheel nut, while the inner sills are connected with the axle by hanger bearings 21 depending from the sills. The supplemental frame is thus pivotally mounted on the rear axle structure and the ordinary truck springs 12 are connected with the rear end of the supplemental frame. Projecting forwardly and upwardly from the front of the supplemental frame are spaced angular arms 22 carrying a horizontal bracket bar 23 having its central portion enlarged to form a bearing head through which is passed a swivel bolt 24. This bolt is provided at its outer end with an eye 25 receiving a shaft 26 carried by and depending from the main truck frame, the lower end of the shaft being mounted in a bracket 27. Coil springs 28 are mounted on the shaft above and below the eye 25 and bear against the eye 25 and against the frame 10 and bracket 27 respectively. A yieldable support for the front end of the supplemental frame is thus afforded and by reason of the swivel connection, it is noted that the supplemental frame may also swing so that the forward ends of the tread belts carried thereby may have relative vertical movement for proper engagement with obstructions over which the vehicle must travel.

Mounted on the rear drive axle 13 in lieu of the ordinary rear wheels thereof are sprocket wheels 29 each sprocket wheel being disposed between the corresponding inner and outer side sills 14 and 15 respectively, and sprocket wheels 30 are mounted in the forward portions of the supplemental frame on shafts 31 journaled in bearing boxes 32 slidable in guides 33 depending from the side sills, these boxes being engageable by screws 34 threaded in the rear portions of the guides, extending longitudinally thereof for engagement with the bearing boxes, to adjust and hold said boxes in a manner insuring proper tension of tread belts trained about the sprocket wheels.

Each of these tread belts comprises an endless band 35 of flexible steel, and to procure a driving connection between the band and its corresponding pair of sprocket wheels, pairs of transverse opposed cleats 36 are mounted on the inner surfaces of the bands, each pair of cleats being provided with opposed angular notches in their contiguous edges producing recesses to receive angular and preferably diamond shaped teeth 38 projecting from the peripheries of the sprocket wheels. These notches are faced with bushings 38$^a$ and thus should looseness occur due to wear upon continued use the bushings may be removed and replaced to procure snug fit of the teeth, oversize bushings compensating for wear of the teeth surfaces.

The cleats 36 have bosses 40 on their outer faces near their ends that engage in corresponding perforations 41 in the band or belt 35 and reach to the opposite surfaces of the belt. Centrally of these bosses are formed perforations continued also through the cleats to receive bolts or screws 42 which extend beyond the ends of the bosses and engage blocks 39; and when the screws are tightened up, the blocks are drawn against the corresponding face of the belt 35 and thus serve to hold the cleats to the belt. Said blocks are of T-shaped cross section, and engaged upon them are rubber shoes or calks 43 having T-channels extending longitudinally thereof and opening through one end, and these calks are slid onto the T-blocks and may be held from sliding from place in any desired manner.

The entire structure described may be readily associated with ordinary types of trucks to provide a very light structure. Longitudinal stretches of the belt treads are inclined upwardly from the rear of the vehicle, and by this inclination the tread surfaces automatically adapt themselves to the surface traveled upon, since in travel upon a hard surface only the rear ends of the treads will engage the ground, while in traveling upon a soft surface the treads will sink into the ground and the length of the tread engagements with the ground will vary in accordance with the depth to which the tread structure penetrates the traveling surface. It is further noted that the tread belt frame is afforded a universally yieldable connection with the truck body so that the frame may be tilted in any direction and at either corner to insure a most efficient clinging engagement with rough ground over which it may travel.

Also, it will be noted that while I have described the present device as an attachment for truck structures already manufactured, the various operative advantages enumerated and the lightness of structure possess equal value in the incorporation of the device in a motor vehicle structure during its manufacture; and that to adapt the device for such incorporation, or for varied conditions of use, various changes and modification of structure may be resorted to without departing in any manner from the spirit of the invention.

What is claimed is:

1. The combination with a motor vehicle; of a tread belt structure comprising a frame, tread belts carried by the frame, a swivel bolt projecting from the forward end of the frame, means for resiliently connecting the swivel bolt with the vehicle frame, and means for resiliently connecting the rear end of the tread belt frame with the vehicle frame.

2. The combination with a motor vehicle; of a tread belt structure comprising a frame, tread belts carried by the frame, a swivel bolt projecting from the forward end of the frame, an eye on the swivel bolt, a vertical shaft slidably passed through said eye and adapted for connection with the vehicle frame, springs mounted on said shaft above and below the eye, and means for resiliently connecting the rear end of the tread belt frame with the vehicle frame.

3. A tread belt structure including a frame, sprocket wheels carried thereby and having teeth of rectangular cross section, an endless flexible band trained about said wheels, and cleats secured in transversely spaced pairs to the band and having opposed notches in their adjacent edges forming recesses shaped to fit the sprocket teeth.

4. A tread belt structure including a frame, a drive sprocket wheel carried thereby, an idle wheel carried thereby, an endless flexible steel band trained about said wheels and lugs on the inner face of said band for engagement by the teeth of the sprocket wheel, said sprocket teeth being diamond shaped in cross section and said lugs being secured in transversely opposed pairs to the steel band and having recesses in their adjacent sides for receiving the sprocket teeth.

5. A tread belt structure for motor vehicles including spaced sprocket wheels having teeth of angular cross section, a band trained around said wheels, cleats disposed across its inner face in pairs and notched in their adjacent edges to form recesses to fit said teeth, shoes across the outer face of said band respectively opposite the cleats, and fastening means passing through the cleats and band and into said shoes.

6. A tread belt structure for motor vehicles including spaced sprocket wheels having teeth of rectangular cross section, a band trained around said wheels, cleats disposed across its inner face in pairs and notched in their adjacent edges to form recesses to fit said teeth, rubber shoes on the outer face of said band opposite the cleats, blocks forming cores within said shoes, and fastening devices passing through each cleat and the band and engaging the block in the corresponding shoe.

7. In a tread belt structure of the class described, the combination with spaced sprocket wheels, and an endless band trained around them and perforated at intervals; of cleats upon the inner face of said band spaced to receive the teeth of said sprockets, the cleats having bosses projecting into said perforations, blocks upon the outer face of the band and across its perforations, tread shoes carried by said blocks, and fastening means passing through the cleats and their bosses and into said blocks.

8. In a tread belt structure of the class described, the combination with spaced sprocket wheels, and an endless band trained around them and perforated at intervals; of cleats upon the inner face of said band spaced to receive the teeth of said sprockets, the cleats having bosses projecting into said perforations, blocks upon the outer face of the band and against the ends of said bosses, the blocks being of T-shaped cross section, fastening screws passing through the cleats and bosses and into the blocks, and tread shoes having channels closely embracing said blocks.

9. In a tread belt structure for the purpose described, the combination with spaced sprocket wheels, and a band trained around them and perforated at intervals; of cleats upon the inner face of the band across its perforations and notched in their edges to receive the teeth of the sprockets, blocks of irregular cross section upon the outer face of said band and across said perforations, fastening devices connecting the cleats and blocks and passing through the perforations, and a soft tread surface upon the outer face of the band channeled to embrace said blocks.

In testimony whereof I affix my signature, in the presence of two witnesses.

RAY H. MUSCOTT.

Witnesses:
  Mrs. MIKE BENKERT,
  JOHN HOULSTON.